Jan. 1, 1963  G. W. WASSELL  3,071,426
ROTARY FILE
Filed May 9, 1958  7 Sheets-Sheet 1
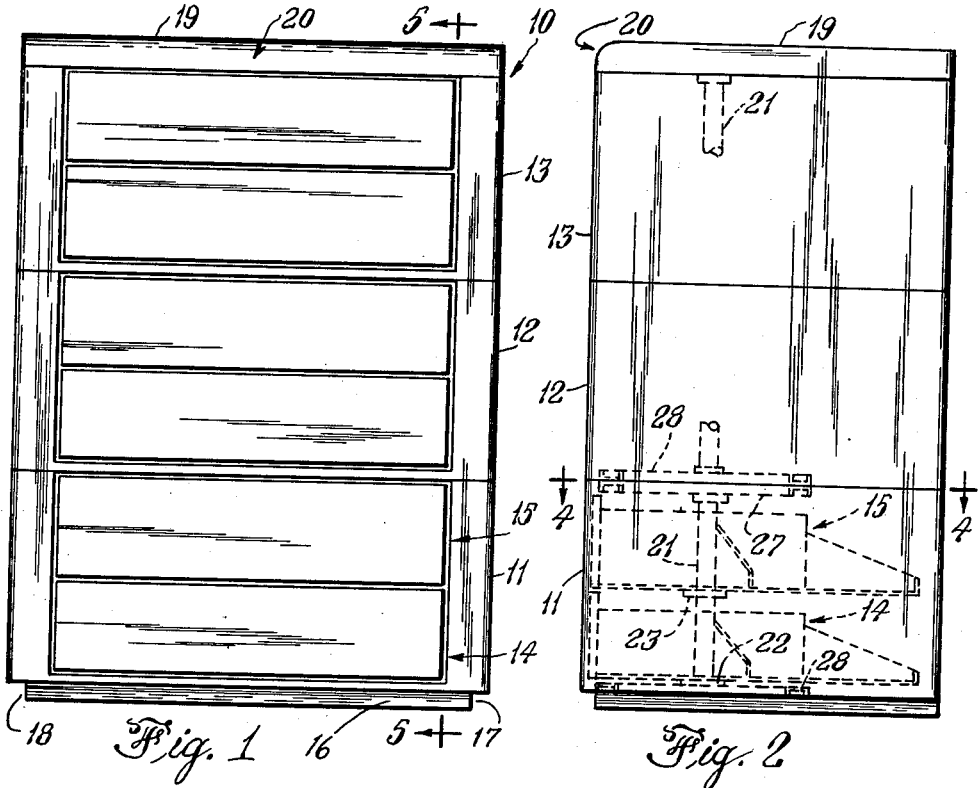
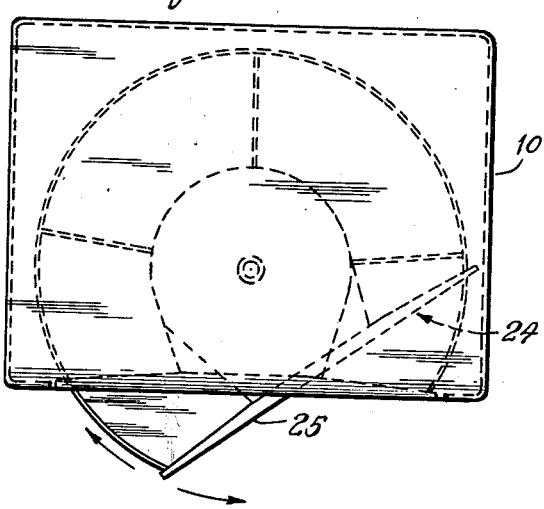
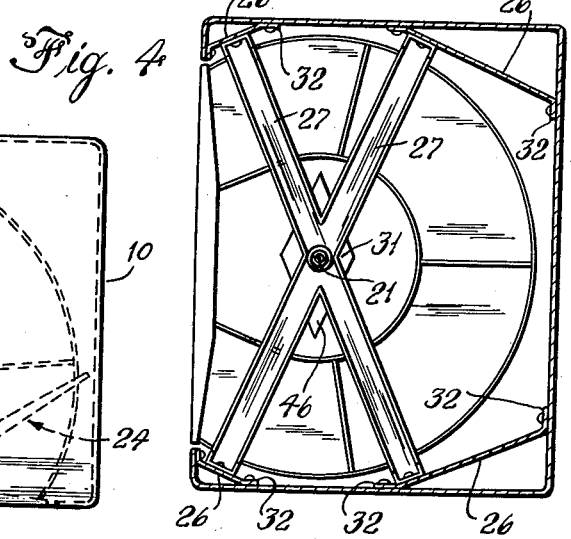
INVENTOR.
GEORGE WILLIAM WASSELL
BY
Brumbaugh, Free, Graves & Donohue
ATTORNEYS Jan. 1, 1963 G. W. WASSELL 3,071,426
ROTARY FILE
Filed May 9, 1958 7 Sheets-Sheet 2

INVENTOR.
GEORGE WILLIAM WASSELL
BY
ATTORNEYS

Jan. 1, 1963 G. W. WASSELL 3,071,426
ROTARY FILE
Filed May 9, 1958 7 Sheets-Sheet 3
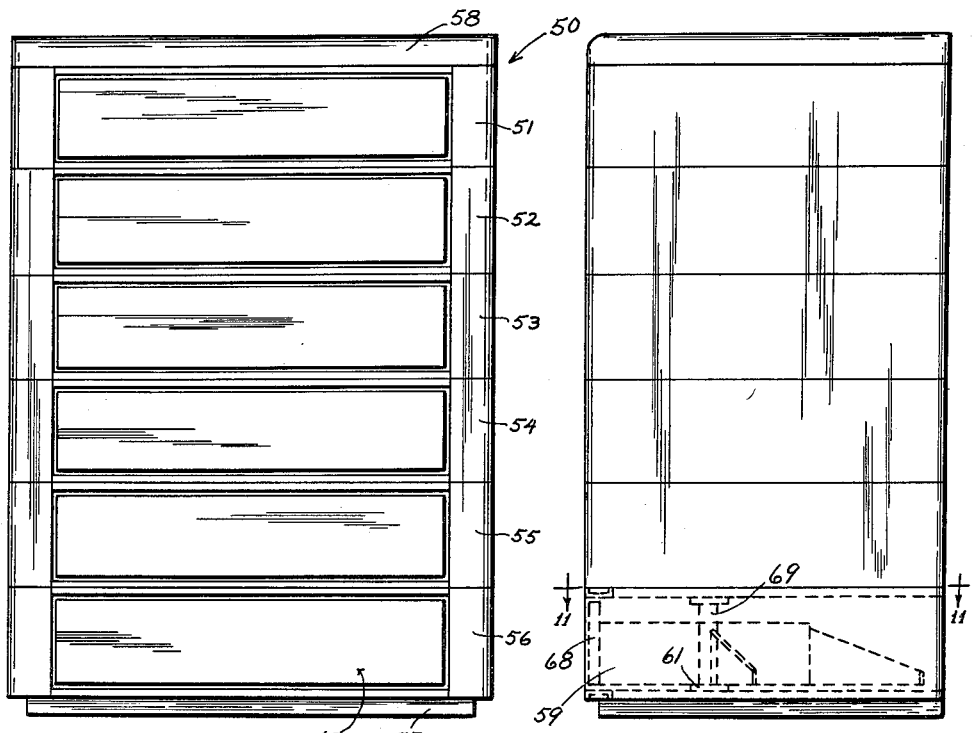
Fig. 8  Fig. 9
Fig. 11
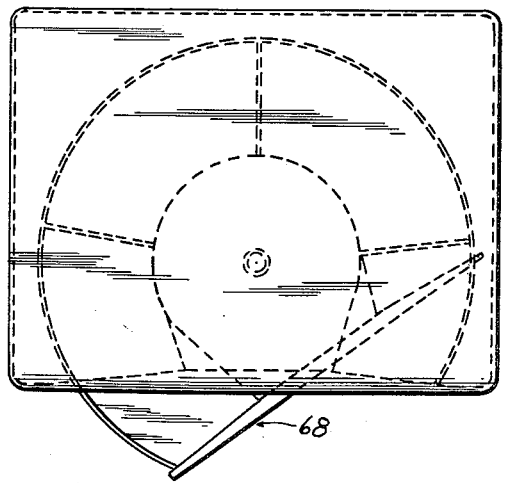
Fig. 10
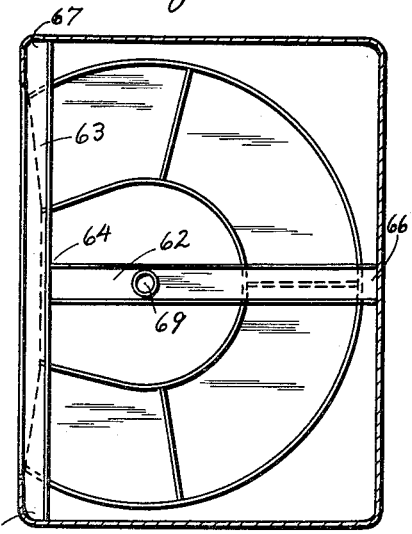
INVENTOR.
GEORGE WILLIAM WASSELL
BY
Brumbaugh, Free, Graves & Donohue
ATTORNEYS

INVENTOR.
GEORGE WILLIAM WASSELL
BY
ATTORNEYS

Jan. 1, 1963

G. W. WASSELL
ROTARY FILE 3,071,426

Filed May 9, 1958

INVENTOR.
GEORGE WILLIAM WASSELL

BY

ATTORNEYS.

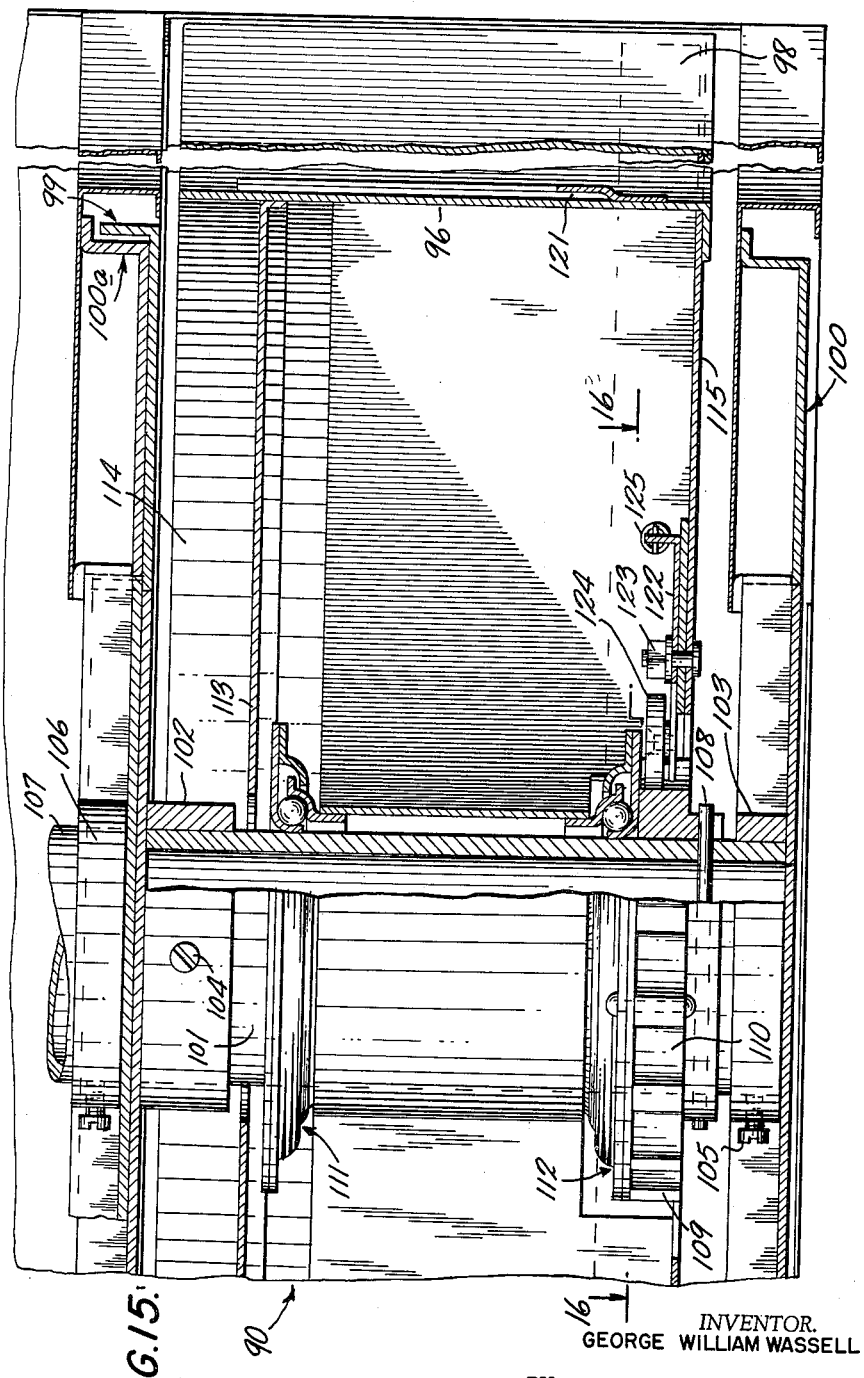

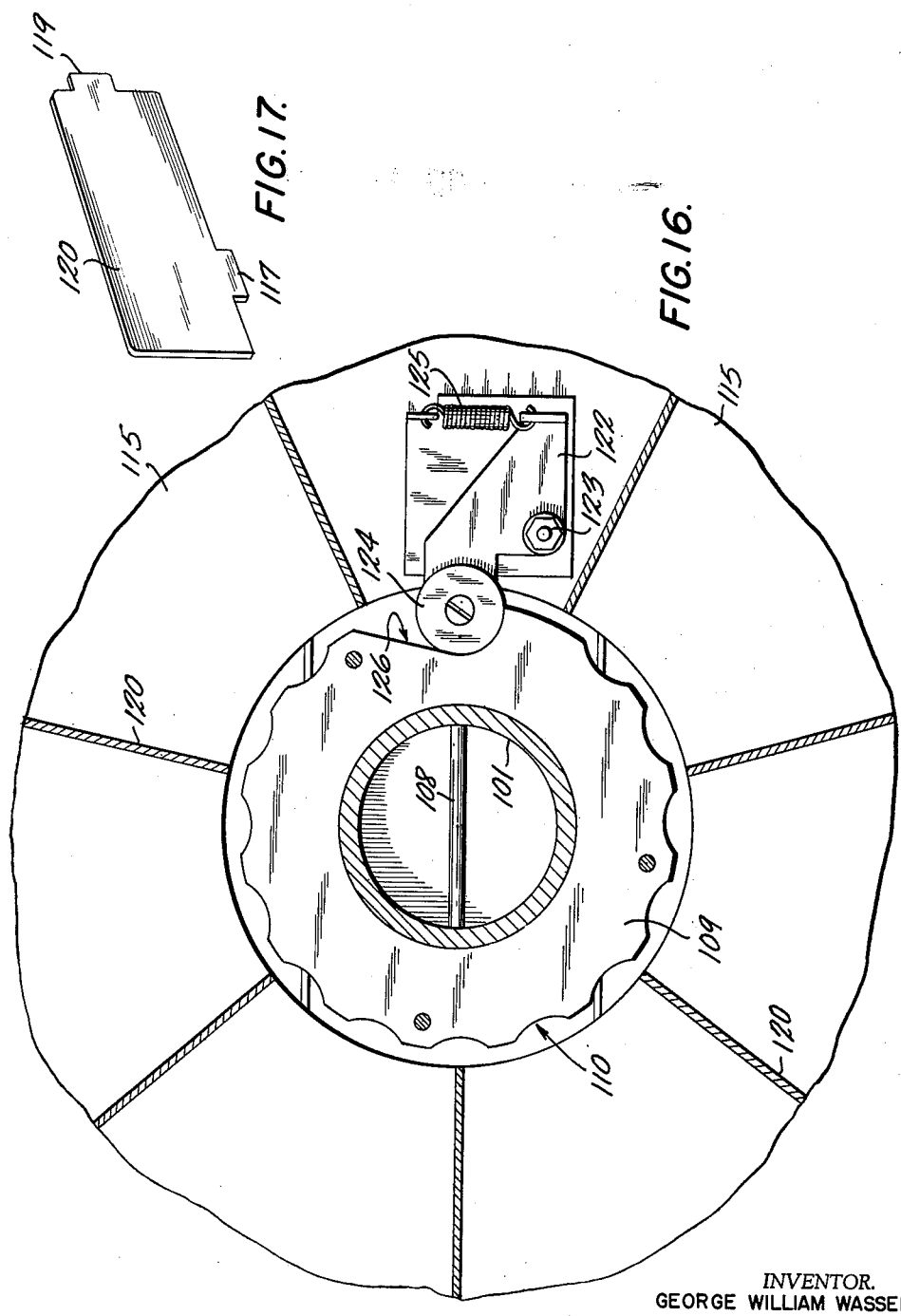

United States Patent Office 3,071,426
Patented Jan. 1, 1963

3,071,426
ROTARY FILE
George William Wassell, Westport, Conn., assignor, by mesne assignments, to Wassell Organization, Inc., Westport, Conn., a corporation of Delaware
Filed May 9, 1958, Ser. No. 734,364
1 Claim. (Cl. 312—305)

This invention relates to rotary files and, in particular, to an improved form of rotary file wherein the files may be vertically stacked to provide a plurality of detachable file sections. This application is a continuation-in-part of my application Serial No. 661,416, filed May 24, 1957, and now abandoned.

Conventional files involving "pull-out" drawers and the like occupy excessive amounts of space and, in addition, require persons using the files to waste much time and effort moving from file to file to obtain access to desired information. Rotary files proposed to replace such conventional filing systems have been bulky and difficult to transport and handle, excessively space consuming and difficult to use.

Accordingly, a principal object of the present invention is to provide a rotary file which permits a maximum utilization of space and a greater efficiency in operation.

Another important object of this invention is to provide a rotary file wherein a rotary file tray has a panel surface to form a closure for the file which disappears and is replaced by filed material as a file tray is rotated.

A still further object of the invention is to provide a new and improved structure for a rotary filing section to facilitate vertical alignment of a plurality of like sections in superimposed relation.

Still another object of the invention is to provide an anti-drift mechanism for operation with the rotary file of the invention.

These and further objects of the invention are accomplished by a rotary file including a plurality of detachable sections, incorporating rotatable filing trays, aligned vertically by interlocking file supporting structure. Cut away front portions on the filing trays, and corresponding closure members which enclose the file sections and provide a panel appearance, open upon rotation of the file trays to afford easy access to filed material.

Another feature of the inventive file comprises an anti-drift mechanism operable to hold the file trays at a selected one of a plurality of angular positions, and to maintain the file trays closed in vertical alignment.

The drawings accompanying and forming part of the specification illustrate one practical commercial embodiment of the invention as applied to a rotary filing cabinet. It is to be understood that the details of construction to be described are simply illustrative of the application of the principles of the invention. Numerous other arrangements may be readily devised by those skilled in the art which will embody the principles of the invention and fall within the spirit and scope of the appended claim.

In the drawings:

FIGURE 1 is a front elevation of a rotary file according to the present invention;

FIGURE 2 is a side elevation of FIGURE 1 partly in dotted section to show the location in the file of rotary file trays;

FIGURE 3 is a top plan view of FIGURE 1 showing the action of a rotary file tray;

FIGURE 4 is a sectional view along the line 4—4 in FIGURE 2;

FIGURE 8 is a front elevation of a modified rotary file in accordance with the present invention;

FIGURE 9 is a side elevation of FIGURE 8 partly in dotted section to show the location of the rotary file trays;

FIGURE 10 is a top plan view of FIGURE 8 showing the action of a rotary filing tray;

FIGURE 11 is a sectional view along the line 11—11 in FIGURE 9;

FIGURE 15 is a view partly in section taken along the line 15—15 in FIGURE 14;

FIGURE 16 is a plan view in section taken along the line 16—16 in FIGURE 15 showing an anti-drift mechanism preferably incorporated in the inventive rotary files; and FIGURE 17 is a perspective view of a removable partition adaptable for use with the inventive rotary files.

Figure 5:
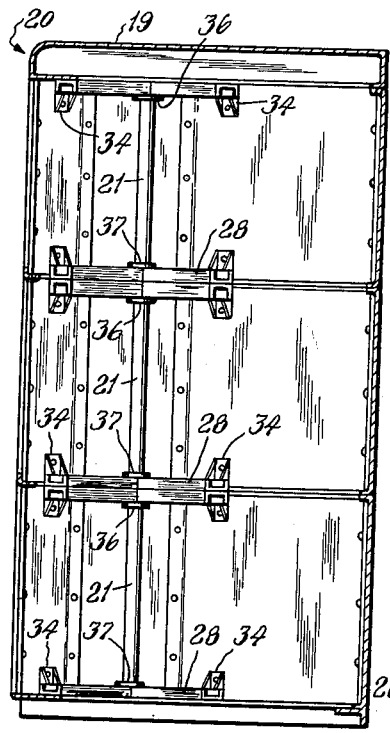
FIGURE 5 is a sectional view along the line 5—5 in FIGURE 1.

Referring now in detail to an illustrative embodiment of the invention with particular reference to the drawings, FIGURE 1 shows a front view of a filing cabinet 10 having three separate file sections 11, 12 and 13 stacked in a superimposed relation. Each of these filing sections has two file trays 14 and 15 which will be described in greater detail hereinafter. The lower section 11 rests upon a stand 16 which is indented from the surface of the cabinet 10 and is formed by bending a strip of material to form the corners 17 and 18. A top section 19, the file sections 11, 12 and 13, and the stand 16 are formed of the same material which may be wood, plastic or, preferably, metal. The front 20 of the top section 19 is rounded to present a more pleasing appearance.

As shown in FIGURE 2, each file section encloses two file trays 14 and 15, described in detail hereinafter, which are supported on a common axle 21 but are not fixedly attached thereto. Each of the two trays 14 and 15 is separately supported by suitable bearings 22 and 23, respectively, such that each of the trays may be rotated independently of each other. Such rotation of each tray is more clearly illustrated in FIGURE 3, which shows the action of one file tray when pressure is applied to one end 24 of a front panel 25. Upon the application of such pressure, the file tray 15 will rotate about its support axle 21 to present the contents of the file to the operator, the front panel 25 disappearing within the cabinet 10.

Figure 6:
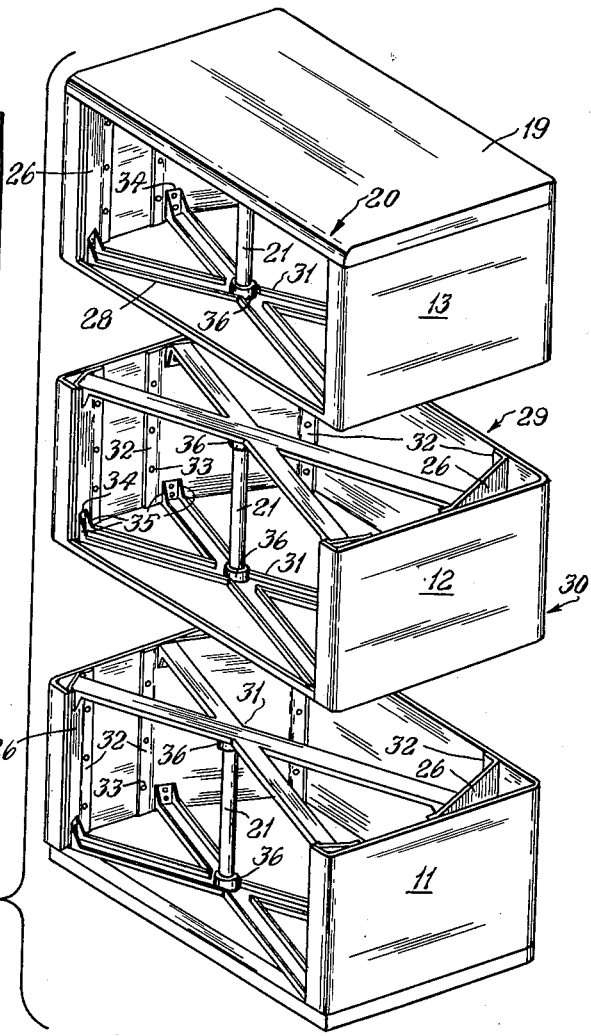
FIGURE 6 is an exploded view in perspective showing three vertically stacked rotary filing sections.

FIGURES 4, 5 and 6 show the construction of the cabinet in greater detail. Each of the filing sections 11, 12 and 13 is provided with a bracing member 26 which serves two purposes; first, to make the individual sections more rigid structurally and second, to provide a means for attaching and anchoring bracing beams 27 and bracing beams 28 extending across the upper and the lower portion 29 and 30, respectively, of each file section.

Preferably the corner bracing members 26 of each section are positioned perpendicularly to the ends of each bracing beam 27 and 28 to facilitate construction. Moreover, since the stresses are uniformly distributed by this symmetrical arrangement, the structural components may be thinner resulting in a lighter weight cabinet.

Each of the corner bracing members 26 is a sheet of material, preferably metal, which extends substantially the full height of each section. The ends 32 of each corner bracing member 26 are bent to form a flush fitting with the respective sides of each section to which it is to be attached by rivets, bolts, spot-welding, metal screws, or any other suitable means 33. In like manner, the ends 34 of each of the bracing beams 27 and 28 are attached to the corner bracing members 26 by any of the above-mentioned or other suitable means 33.

The specific thickness of the corner bracing members 26 and other portions of the filing sections is dictated by the size of the cabinet 10 to be constructed and by the weight of the material to be stored therein. Also, a construction in accordance with the present invention will lend itself to the use of bracing beams of different cross sectional shapes, such as for example, rectangular cross section or U-shaped cross section. In either case, the respective ends 34 are bent to form approximately 90° angles to provide means for attaching the beams 27 and 28 to the corner bracing members 26. Triangular flanges 35 are welded or otherwise attached to provide additional support, if needed.

At the intersection 31 of each lower bracing beam 28 a collar 36 (FIGURE 6) or a bearing 37 (FIGURE 5) is positioned about the lower end of each axle 21 to support each lower filing tray. For smaller cabinets to contain lighter material, the lower end supports 36 on each axle 21 need only be bushings or collars, whereas for larger cabinets to contain heavy material, these end supports must be roller or ball thrust bearings 37 against which the respective rotary lower filing trays will turn. If bearings are used, generally it is only necessary to provide a bearing at the lower end of each axle 21 to support the lower of the two filing trays in each section. The upper filing tray in each section is supported by a bearing 23 attached approximately midway of each axle 21 as shown in FIGURE 2.

A bushing 36, which is located at the upper end of each axle 21, provides no support for the upper filing tray 15 and therefore if the cross beams are U-shaped in cross section, the bushing is recessed within the bracing beams 27 so as not to interfere with the upper filing tray 15. The lower thrust bearing 37 for each axle 21 (FIGURE 5) is placed so that it is available for supporting the lower filing tray 14.

Figure 7:
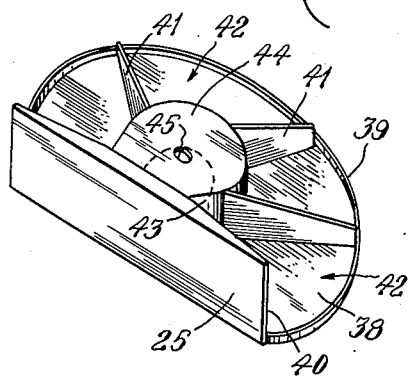
FIGURE 7 is a perspective view of one filing tray in accordance with the present invention.

One of the filing trays is shown in perspective in FIGURE 7 of the drawings. This view shows a front surface or closure panel 25 which serves to close the cabinet 10 when the filing tray is in the position shown in FIGURE 4. The front panel 25 is perpendicular to a plate 38, in the shape of a circular segment, which forms the bottom of the filing tray. In other words, outer periphery 39 of the plate 38 of each filing tray forms a circle except for the cutaway portion or section 40 defined by a chord of the circle, to which the front panel 25 is attached.

The edge 39 around the periphery of the bottom plate 38 of each filing tray is turned upwardly at approximately a 90° angle. Several spaced apart partitions 41 serve to divide the surface into a series of bins 42 with the depth of each bin 42 being defined by a cylindrical wall 43 about the pivotal axis (FIGURE 4) of the filing tray. A top plate 44 joins the edges of the curved inner wall 43 of the bins 42 and also provides a means for defining an aperture 45 through which the support axle 21 supports the filing tray.

In relatively small files to carry lightweight material, the aperture 45 will be dimensioned to fit snugly about the support axle 21, the bottom plate 38 resting upon the bushing or collar 36 (FIGURE 6). On the other hand, if the cabinet 10 is relatively large in size and is constructed to contain heavy material, a roller or ball bearing (not shown) will be press fitted into the aperture 45 and the lower plate 38 will be supported by a suitable thrust bearing 37 (FIGURE 5). In this latter case, it has been found desirable to strengthen the top plate by a diamond shaped reinforcement 46 as shown in FIGURE 4. The reinforcement 46 is secured to the top plate 44 by any suitable means, for example welding, riveting, or the like.

In use, any number of sections may be positioned in superimposed relation, the top 19 being mounted on the uppermost section. Any desired filing section is opened by pressing on either end of the front closure panel 25. Upon the application of pressure at one end of the panel, the filing tray rotates about its respective axle 21 to bring the contents of the file into view, the closure panel 25 disappearing into the cabinet.

A modification of the outer cabinet structure to which the present invention is adaptable is illustrated in FIGURES 8, 9, 10 and 11 of the drawings. As indicated by the numeral 50, the outer cabinet is composed of individual sections 51, 52, 53, 54, 55 and 56. The bottom filing section 56 is mounted directly on a base 57 which is indented in a similar manner as the base 16 shown in FIGURE 1. A top 58 is positioned over the upper filing section 51 in a manner similar to that described in connection with the cabinet shown in FIGURE 1. The purpose of having these individual sections 51–56 will be more readily apparent from the detailed description to follow.

As shown by the dotted section in FIGURE 9, and FIGURE 10, the rotary file tray with the attached closure panel 68 is similar to that as previously described in connection with FIGURE 1, the principal distinction being that the filing trays are individual rather than dual. This arrangement permits the use of a support axle 69 extending only throughout the height of each individual rotary file. Each rotary file is supported on its respective axle in a vertically disposed relation. With the filing trays individually mounted on their respective axles, it is necessary to supply suitable bearings at each end of each respective axle. These bearings would be similar to those previously described in connection with FIGURE 1.

As shown in FIGURE 11 of the drawings, the bracing beams 62 and 63 used in this arrangement are somewhat different from that previously described. A T-shaped arrangement of beam structure is provided by the forward-aft positioning of the beam 62 and the side-to-side positioning of the beam 63, the two beams being welded, or otherwise attached, at the point of contact 64. The ends 65, 66 and 67 of the T-shaped structure are attached to the sides and back of the cabinet by any suitable means such as bolts. Thus a support structure is provided not only to strengthen the outer walls of the cabinet but to provide support for each individual axle 69.

Figure 12:
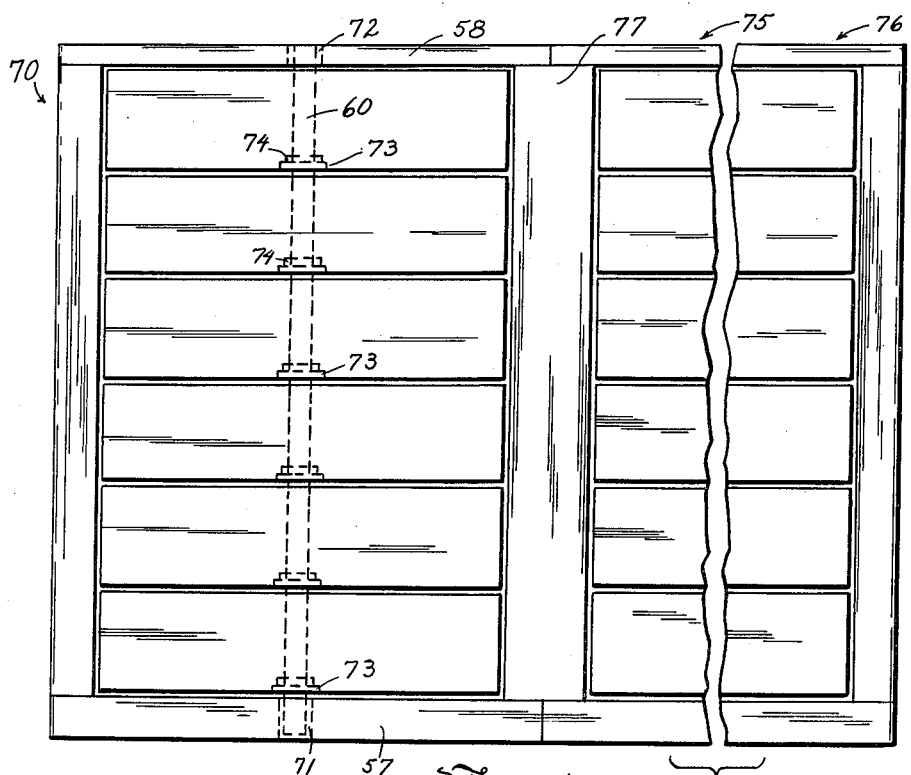
FIGURE 12 is a front elevation of a further modified rotary file in accordance with the present invention.
Figure 13:
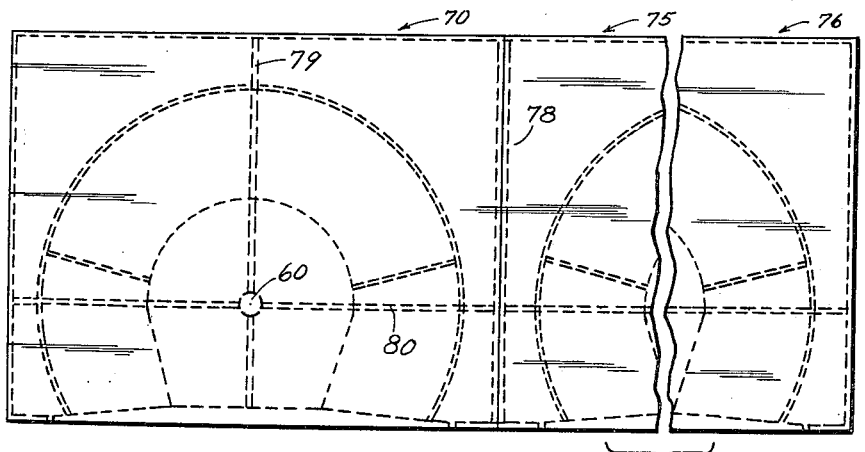
FIGURE 13 is a top plan view of FIGURE 12 partly in dotted section to show the location of the rotary file trays.

FIGURES 12 and 13 show a variation of the cabinet arrangement for the present invention. The cabinet 70 is shown with a plurality of filing trays spaced apart in a vertical tier each supported by a common axle 60. The axle 60 is supported at each end by suitable bushings 71 and 72 in the base 57 and the top 58, respectively. Spaced along the vertical axle 60 is a plurality of bushings 73 cooperating with the bearings 74 to support each of the filing trays rotatably.

With this outer cabinet structure, any number of filing section tiers are positioned side-by-side along a row to form any desired number of cabinet divisions, FIGURE 12 showing three cabinet divisions 70, 75 and 76. When the outer cabinets are spaced side-by-side in this arrangement, a panel 77 is positioned between each division. The partition 78, shown in FIGURE 13 separating the divisions 70 and 75, may be eliminated if desired where the cabinets are positioned in a permanent arrangement.

The particular support beams 79 and 80 shown in FIGURE 13 are similar to those shown in FIGURE 11 with the exception that the beam 80 traverses the width of the cabinet in the plane of the support axle 60. Attachment of the beams 79 and 80 at their intersection is by welding, or any other suitable means, and the ends of the beams are fastened to the sides and back of the cabinet by bolts, rivets, welding, or the like.

In any of the cabinet arrangements shown in FIGURES 1, 8 and 12, or even where the filing sections are built into a wall with parts of or all of the outer cabinet omitted, the individual file trays operate in the same manner. That is, by the application of pressure to either end of a selected closure panel, the filing tray will rotate to reveal the contents of the file.

Figure 14:
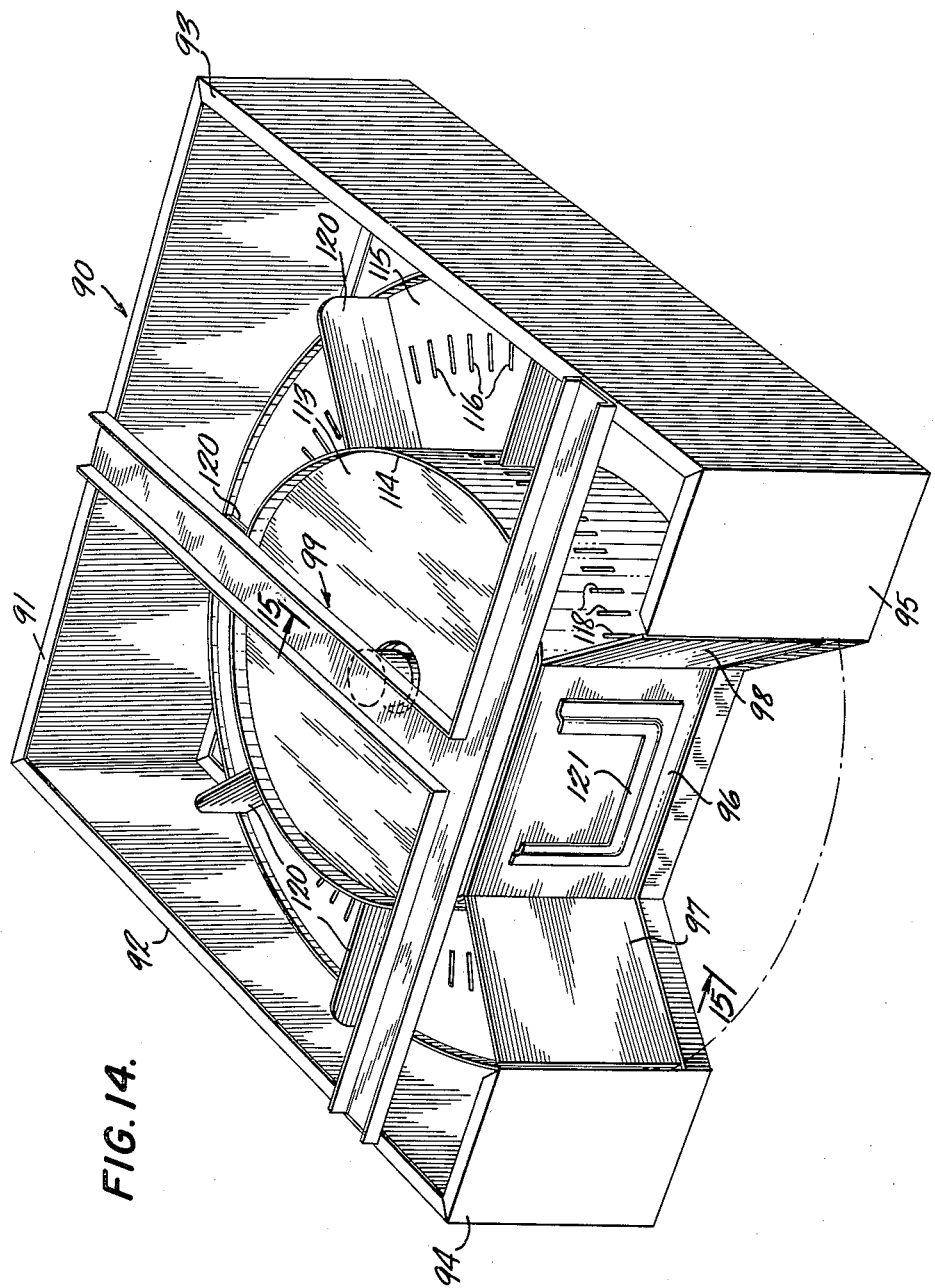
FIGURE 14 is a perspective view of another modified rotary file section according to the invention.

Referring now to a modification of the invention, reference is made to FIGURE 14 of the drawings. The numeral 90 refers generally to the filing section, adapted to be vertically stacked, of this embodiment of the invention, and the numerals 91, 92 and 93 indicate the rear and two side panels, respectively. Substantially rigid front partial panels 94 and 95 are formed integrally with or attached to the side panels 92 and 93, respectively, and cooperate with the front closure panel 96, and file end panels 97 and 98, to form an enclosure for the rotary filing section. The panels 96, 97 and 98 define a cut-away section on the rotatable file tray.

The numerals 99 and 100 indicate, generally, the upper and lower T-shaped bracing members, respectively. However, it is to be understood that the X bracing arrangement as shown in FIGURE 4 of the drawings may be used with this embodiment of the invention, if desired. For convenience, therefore, the description will refer to the T-shaped bracing beams as shown in FIGURE 14.

As better seen in FIGURE 15 of the drawings, the upper bracing beams 99 are somewhat larger than the lower bracing beams 100 for each respective filing section to permit the lower bracing beams 100a of a superimposed filing section to nest within the bracing beams 99 of the supporting filing section. In this manner, the various filing sections making up a cabinet are interlocked when the sections are stacked in vertical alignment and relative movement therebetween is eliminated.

Each respective filing section 90 is provided with an axle 101 supported in a substantially vertical position between upper and lower bushings 102 and 103, respectively. With the axle 101 in position, threaded screws 104 and 105 are tightened to prevent the axle 101 from rotating. These bushings 102 and 103 are attached to the bracing beams 99 and 100, respectively, by any suitable means as, for example, by welding.

Also visible in FIGURE 15 is, as previously mentioned, the lower bracing beam 100a of a super-imposed filing section and a lower bushing 106 in which is supported the lower end of an axle 107.

Fixedly attached to the axle 101 by a pin 108 is an annular collar 109 having a series of arcuate indentations 110 around the periphery thereof. This may also be seen in FIGURE 16 of the drawings, concerning which a more detailed description will be presented presently.

Upper and lower roller bearing assemblies 111 and 112, respectively, rotatably support the filing tray on the axle 101.

The central portion of the rotatable filing tray is formed, generally, of an annular upper surface 113 with a cylindrical surface 114 arranged in a substantially vertical position about the periphery of the surface 113 as shown in both FIGURES 14 and 15. An annular plate 115 forms the bottom of the filing tray and is provided with a plurality of spaced-apart slots 116 to receive a projection 117 (FIGURE 17) of a removable partition 120. Small slots 118 are also spaced apart around the arcuate surface 114 to receive a projection 119 (FIGURE 17) of the removable partition 120.

The front panel 96 of the tray may be provided with an angle member 121 fixedly attached thereto to receive a card, or the like, identifying the contents of the file.

The bracing members 99 and 100 and the other portions of the filing sections are formed of a material of suitable thickness as determined by such factors as the size of the filing section 90 and by the weight of the material to be stored therein. Of course, it is preferred that the filing sections according to the invention be formed of metal, although it is to be understood that the invention is not limited to this particular material.

Referring now in detail to the anti-drift mechanism as shown in FIGURE 16 of the drawings, the annular collar 109, as previously mentioned, is fixedly attached to the axle 101 by the pin 108. An arm 122 is pivotally attached to the surface 115 by a suitable threaded bolt 123, or the like, and is provided, at one end, with a roller 124 and, at the opposite end, with a tension spring 125. The effect of the spring 125 is to maintain the roller 124 in engagement with the arcuate indentations or indexing locations 110 and 126 of the collar 109. These arcuate indentations 110 may be formed in any desired pattern, it being preferred that they be positioned to permit a particular filing bin to be exposed at the front of the cabinet section when the roller 124 is in engagement with a particular indentation. The larger recess 126, which may be V-shaped or as shown in FIGURE 16, is provided in an appropriate position to arrest the rotation of the filing section at the position when the front panels close the filing section, as shown in FIGURE 14 of the drawings. By this arrangement, the filing section may be closed more easily by simply pressing on either panel 97 or 98 with sufficient force to cause the roller to move past the smaller indentations 110 until it comes to rest in the larger recess 126 at which point the front panels are in their closed position.

The anti-drift mechanism has been found to be a desirable feature particularly with the rotary type of file according to the invention. Due to unbalances developed by material being placed non-uniformly in the rotary file, the filing section will not always maintain a desired position, but will drift slightly. The anti-drift mechanism has been developed to overcome this disadvantage and maintain all stacked file sections in perfect alignment.

While the invention has been described with reference to the particular construction shown, it is not restricted to the exact details herein disclosed, but is defined by the following claim.

I claim:

Rotary file apparatus comprising a plurality of superimposed rotatable file trays, axle means rotatably supporting the file trays for unlimited rotation in both directions, anti-drift mechanism to arrest and retain each of the file trays in a selected one of a plurality of indexed positions including a closed position, the anti-drift mechanism including a first member having a plurality of indentations and a spring biased second member cooperating with the indentations, one of the first and second members being connected to each of the file trays and moving relatively to the other member during rotation of the file tray, one of the indexed locations for the tray being provided each time the spring biased member is urged into one of the indentations, and one of the indentations in the first member being formed to cooperate with the spring biased member and hold the file tray in its closed position against greater rotational forces than it is held in its other indexed positions.

References Cited in the file of this patent

UNITED STATES PATENTS

| 724,870 | Hullhorst | Apr. 7, 1903 |
| 1,249,755 | Holmgren | Dec. 11, 1917 |
| 2,239,734 | Pratt | Apr. 29, 1941 |
| 2,693,401 | Brown | Nov. 2, 1954 |
| 2,698,776 | Stoeckl | Jan. 4, 1955 |
| 2,827,354 | Wassell | Mar. 18, 1958 |
| 2,856,255 | Doesken | Oct. 14, 1958 |

FOREIGN PATENTS

| 141,357 | Australia | May 24, 1951 |